United States Patent
Lutter (10) Patent No.: US 12,222,512 B2
(45) Date of Patent: Feb. 11, 2025

(54) DISPLAYING CONTENT BASED ON STATE INFORMATION

(71) Applicant: Apple Inc., Cupertino, CA (US)

(72) Inventor: Gregory Lutter, Boulder Creek, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/339,121

(22) Filed: Jun. 21, 2023

(65) Prior Publication Data

US 2024/0061250 A1    Feb. 22, 2024

Related U.S. Application Data

(60) Provisional application No. 63/399,151, filed on Aug. 18, 2022.

(51) Int. Cl.
*G02B 27/01* (2006.01)

(52) U.S. Cl.
CPC .. *G02B 27/0172* (2013.01); *G02B 2027/0138* (2013.01); *G02B 2027/014* (2013.01); *G02B 2027/0141* (2013.01)

(58) Field of Classification Search
CPC ........ G02B 27/0172; G02B 2027/0138; G02B 2027/014; G02B 2027/0141
See application file for complete search history.

(56) References Cited

U.S. PATENT DOCUMENTS 9,880,441 B1 *   1/2018  Osterhout .............. G02B 7/006
10,452,133 B2   10/2019  Miller et al.
(Continued)

FOREIGN PATENT DOCUMENTS

CN          111427316 A       7/2020

OTHER PUBLICATIONS

Iqbal H. Sarker, Context aware rule learning from smartphone data: survey, challenges and future directions, Journal of Big Data, Oct. 2019, pp. 1-25, Springer Nature.
(Continued)

*Primary Examiner* — Sahlu Okebato
(74) *Attorney, Agent, or Firm* — Treyz Law Group, P.C.; Joseph F. Guihan (57) ABSTRACT

A head-mounted device may determine contextual information by analyzing sensor data. The head-mounted device may use computer vision analysis to determine contextual information from images of the physical environment around the head-mounted device. Instead or in addition, the head-mounted device may determine contextual information by receiving state information directly from external equipment within the physical environment. Based on the received state information, the head-mounted device may display content, play audio, change a device setting on the head-mounted device, the external equipment, and/or additional external equipment, and/or may open an application. The head-mounted device may receive the state information in accordance with identifying the external equipment in images of the physical environment. The head-mounted device may receive the state information and then obtain and analyze sensor data to determine contextual information in response to the received state information being insufficient.

21 Claims, 5 Drawing Sheets

(56) References Cited

U.S. PATENT DOCUMENTS

| | | | |
|---|---|---|---|
| 10,580,407 | B1 | 3/2020 | Sriram et al. |
| 10,637,897 | B2 | 4/2020 | Miller |
| 10,764,153 | B2 | 9/2020 | McLaughlin et al. |
| 10,841,174 | B1* | 11/2020 | Ely .................... G06F 3/04817 |
| 2017/0246070 | A1* | 8/2017 | Osterhout ................ G06T 5/73 |
| 2018/0196425 | A1* | 7/2018 | Kobayashi ............ B64C 39/024 |
| 2018/0224928 | A1 | 8/2018 | Ross et al. |
| 2019/0187945 | A1* | 6/2019 | Liu ....................... G06F 3/1222 |
| 2021/0063744 | A1* | 3/2021 | Maric ................ G02B 27/0172 |
| 2023/0020913 | A1* | 1/2023 | Yoon ........................ G06F 3/14 |

OTHER PUBLICATIONS

Mohammad Aliannejadi et al., Context-Aware Target Apps Selection and Recommendation for Enhancing Personal Mobile Assistants, 2019, pp. 1-30, vol. 0, No. 0, ACM Transactions on Information Systems.

Detect when users start or end an activity, https://developer.android.com/guide/topics/location/transitions, May 19, 2022, pp. 1-8.

U.S. Appl. No. 63/325,147, filed Mar. 30, 2022.

\* cited by examiner

DISPLAYING CONTENT BASED ON STATE INFORMATION

This application claims priority to U.S. provisional patent application No. 63/399,151, filed Aug. 18, 2022, which is hereby incorporated by reference herein in its entirety.

BACKGROUND

This relates generally to electronic devices, and, more particularly, to electronic devices with displays.

Some electronic devices such as head-mounted devices include displays that are positioned close to a user's eyes during operation (sometimes referred to as near-eye displays). The displays may be used to display virtual content.

SUMMARY

An electronic device may include one or more sensors, communication circuitry, one or more processors, and memory storing instructions configured to be executed by the one or more processors, the instructions for: obtaining, via the one or more sensors, sensor data that includes one or more images, analyzing the sensor data to detect an external electronic device in the one or more images, obtaining, via the communication circuitry, state information from the external electronic device, and in accordance with a determination that the state information is sufficient, presenting content that is based on the state information received from the external electronic device.

An electronic device may include one or more sensors, communication circuitry, one or more processors, and memory storing instructions configured to be executed by the one or more processors, the instructions for: obtaining, via the communication circuitry, state information from an external electronic device and in accordance with a determination that the state information received from the external electronic device is insufficient: obtaining, via the one or more sensors, sensor data that includes one or more images, analyzing the sensor data to determine contextual information, and presenting content that is based on the contextual information.

DETAILED DESCRIPTION

Head-mounted devices may display different types of extended reality content for a user. The head-mounted device may display a virtual object that is perceived at an apparent depth within the physical environment of the user. Virtual objects may sometimes be displayed at fixed locations relative to the physical environment of the user. For example, consider an example where a user's physical environment includes a table. A virtual object may be displayed for the user such that the virtual object appears to be resting on the table. As the user moves their head and otherwise interacts with the XR environment, the virtual object remains at the same, fixed position on the table (e.g., as if the virtual object were another physical object in the XR environment). This type of content may be referred to as world-locked content (because the position of the virtual object is fixed relative to the physical environment of the user).

Other virtual objects may be displayed at locations that are defined relative to the head-mounted device or a user of the head-mounted device. First, consider the example of virtual objects that are displayed at locations that are defined relative to the head-mounted device. As the head-mounted device moves (e.g., with the rotation of the user's head), the virtual object remains in a fixed position relative to the head-mounted device. For example, the virtual object may be displayed in the front and center of the head-mounted device (e.g., in the center of the device's or user's field-of-view) at a particular distance. As the user moves their head left and right, their view of their physical environment changes accordingly. However, the virtual object may remain fixed in the center of the device's or user's field of view at the particular distance as the user moves their head (assuming gaze direction remains constant). This type of content may be referred to as head-locked content. The head-locked content is fixed in a given position relative to the head-mounted device (and therefore the user's head which is supporting the head-mounted device). The head-locked content may not be adjusted based on a user's gaze direction. In other words, if the user's head position remains constant and their gaze is directed away from the head-locked content, the head-locked content will remain in the same apparent position.

Second, consider the example of virtual objects that are displayed at locations that are defined relative to a portion of the user of the head-mounted device (e.g., relative to the user's torso). This type of content may be referred to as body-locked content. For example, a virtual object may be displayed in front and to the left of a user's body (e.g., at a location defined by a distance and an angular offset from a forward-facing direction of the user's torso), regardless of which direction the user's head is facing. If the user's body is facing a first direction, the virtual object will be displayed in front and to the left of the user's body. While facing the first direction, the virtual object may remain at the same, fixed position relative to the user's body in the XR environment despite the user rotating their head left and right (to look towards and away from the virtual object). However, the virtual object may move within the device's or user's field of view in response to the user rotating their head. If the user turns around and their body faces a second direction that is the opposite of the first direction, the virtual object will be repositioned within the XR environment such that it is still displayed in front and to the left of the user's body. While facing the second direction, the virtual object may remain at the same, fixed position relative to the user's body in the XR environment despite the user rotating their head left and right (to look towards and away from the virtual object).

In the aforementioned example, body-locked content is displayed at a fixed position/orientation relative to the user's body even as the user's body rotates. For example, the virtual object may be displayed at a fixed distance in front of the user's body. If the user is facing north, the virtual object is in front of the user's body (to the north) by the fixed distance. If the user rotates and is facing south, the virtual object is in front of the user's body (to the south) by the fixed distance.

Alternatively, the distance offset between the body-locked content and the user may be fixed relative to the user whereas the orientation of the body-locked content may remain fixed relative to the physical environment. For example, the virtual object may be displayed in front of the user's body at a fixed distance from the user as the user faces north. If the user rotates and is facing south, the virtual object remains to the north of the user's body at the fixed distance from the user's body.

Body-locked content may also be configured to always remain gravity or horizon aligned, such that head and/or body changes in the roll orientation would not cause the body-locked content to move within the XR environment. Translational movement may cause the body-locked content to be repositioned within the XR environment to maintain the fixed distance from the user. Subsequent descriptions of body-locked content may include both of the aforementioned types of body-locked content.

Figure 1:
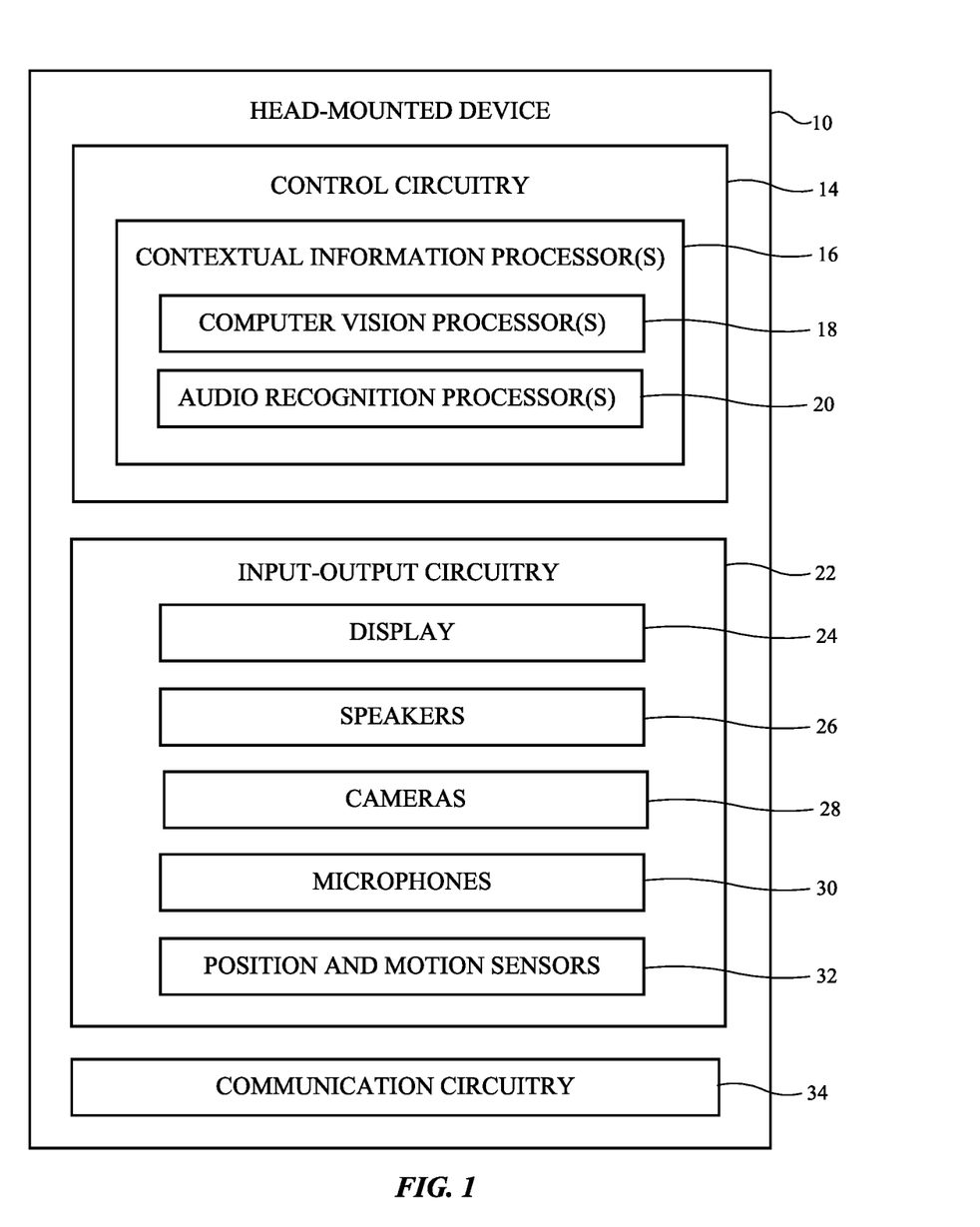
FIG. 1 is a schematic diagram of an illustrative head-mounted device in accordance with some embodiments.

A schematic diagram of an illustrative electronic device is shown in FIG. 1. As shown in FIG. 1, electronic device 10 (sometimes referred to as head-mounted device 10, system 10, head-mounted display 10, etc.) may have control circuitry 14. In addition to being a head-mounted device, electronic device 10 may be other types of electronic devices such as a cellular telephone, laptop computer, speaker, computer monitor, electronic watch, tablet computer, etc. Control circuitry 14 may be configured to perform operations in head-mounted device 10 using hardware (e.g., dedicated hardware or circuitry), firmware and/or software. Software code for performing operations in head-mounted device 10 and other data is stored on non-transitory computer readable storage media (e.g., tangible computer readable storage media) in control circuitry 14. The software code may sometimes be referred to as software, data, program instructions, instructions, or code. The non-transitory computer readable storage media (sometimes referred to generally as memory) may include non-volatile memory such as non-volatile random-access memory (NVRAM), one or more hard drives (e.g., magnetic drives or solid-state drives), one or more removable flash drives or other removable media, or the like. Software stored on the non-transitory computer readable storage media may be executed on the processing circuitry of control circuitry 14. The processing circuitry may include application-specific integrated circuits with processing circuitry, one or more microprocessors, digital signal processors, graphics processing units, a central processing unit (CPU) or other processing circuitry.

Control circuitry 14 may include one or more contextual information processors 16 such as computer vision processor(s) 18 and audio recognition processor(s) 20. The contextual information processors 16 may be configured to analyze sensor data from head-mounted device 10 to determine contextual information for head-mounted device. The contextual information may include any information regarding how the head-mounted device is being used, an activity being performed by the head-mounted device, information from the physical environment around the user of the head-mounted device, etc.

Computer vision processor(s) 18 may analyze images of the physical environment around the user (e.g., using images from one or more cameras in head-mounted device 10) to determine contextual information. For example, if the user of the head-mounted device is in a vehicle, the computer vision processor(s) may analyze images to identify a steering wheel and dashboard. The contextual information processors 16 may correspondingly determine that the head-mounted device is located in a vehicle based on the identified steering wheel and dashboard. If the user of the head-mounted device is in a kitchen, the computer vision processor(s) may analyze images to identify a refrigerator, microwave, and oven. The contextual information processors 16 may correspondingly determine that the head-mounted device is located in a kitchen based on the identified refrigerator, microwave, and oven.

Audio recognition processor(s) 20 (sometimes referred to as speech recognition processors 20) may analyze audio data from the physical environment around the user (e.g., from one or more microphones in head-mounted device 10) to determine contextual information. The audio recognition processors may determine, for example, when the user of the head-mounted device is speaking, when someone other than the user of the head-mounted device is speaking, when music is playing, when certain events occur (e.g., a door closing), etc. The contextual information processors 16 may make a contextual determination based on the type of audio recognized by audio recognition processors 20.

The representation of computer vision processors 18 as separate from audio recognition processors 20 in FIG. 1 is merely illustrative. In general, any desired subset of processing resources in control circuitry 14 may be used to analyze sensor data for computer vision purposes, any desired subset of processing resources in control circuitry 14 may be used to analyze sensor data for audio recognition purposes, and any desired subset of processing resources in control circuitry 14 may be used to make contextual determinations.

Head-mounted device 10 may include input-output circuitry 22. Input-output circuitry 22 may be used to allow a user to provide head-mounted device 10 with user input. Input-output circuitry 22 may also be used to gather information on the environment in which head-mounted device 10 is operating. Output components in circuitry 22 may allow head-mounted device 10 to provide a user with output.

As shown in FIG. 1, input-output circuitry 22 may include a display such as display 24. Display 24 may be used to display images for a user of head-mounted device 10. Display 24 may be a transparent or translucent display so that a user may observe physical objects through the display while computer-generated content is overlaid on top of the physical objects by presenting computer-generated images on the display. A transparent or translucent display may be formed from a transparent or translucent pixel array (e.g., a transparent organic light-emitting diode display panel) or may be formed by a display device that provides images to a user through a transparent structure such as a beam splitter, holographic coupler, or other optical coupler (e.g., a display device such as a liquid crystal on silicon display). Alternatively, display 24 may be an opaque display that blocks light from physical objects when a user operates head-mounted device 10. In this type of arrangement, a pass-through camera may be used to display physical objects to the user. The pass-through camera may capture images of the physical environment and the physical environment images may be displayed on the display for viewing by the user. Additional computer-generated content (e.g., text, game-content, other visual content, etc.) may optionally be overlaid over the physical environment images to provide an extended reality environment for the user. When display 24 is opaque, the display may also optionally display entirely computer-generated content (e.g., without displaying images of the physical environment).

Display 24 may include one or more optical systems (e.g., lenses) (sometimes referred to as optical assemblies) that allow a viewer to view images on display(s) 24. A single display 24 may produce images for both eyes or a pair of displays 24 may be used to display images. In configurations with multiple displays (e.g., left and right eye displays), the focal length and positions of the lenses may be selected so that any gap present between the displays will not be visible to a user (e.g., so that the images of the left and right displays overlap or merge seamlessly). Display modules (sometimes referred to as display assemblies) that generate different images for the left and right eyes of the user may be referred to as stereoscopic displays. The stereoscopic displays may be capable of presenting two-dimensional content (e.g., a user notification with text) and three-dimensional content (e.g., a simulation of a physical object such as a cube).

Input-output circuitry 22 may include various other input-output devices. For example, input-output circuitry 22 may include one or more speakers 26 that are configured to play audio and one or more cameras 28. Cameras 28 may include one or more outward-facing cameras (that face the physical environment around the user when the head-mounted device is mounted on the user's head). Cameras 28 may capture visible light images, infrared images, or images of any other desired type. The cameras may be stereo cameras if desired. Outward-facing cameras may capture pass-through video for device 10. Input-output circuitry 22 also may include one or more microphones 30 that are configured to capture audio data from the user and/or from the physical environment around the user.

As shown in FIG. 1, input-output circuitry 22 may include position and motion sensors 32 (e.g., compasses, gyroscopes, accelerometers, and/or other devices for monitoring the location, orientation, and movement of head-mounted device 10, satellite navigation system circuitry such as Global Positioning System circuitry for monitoring user location, etc.). Using sensors 32, for example, control circuitry 14 can monitor the current direction in which a user's head is oriented relative to the surrounding environment (e.g., a user's head pose). The outward-facing cameras in cameras 28 may also be considered part of position and motion sensors 32. The outward-facing cameras may be used for face tracking (e.g., by capturing images of the user's jaw, mouth, etc. while the device is worn on the head of the user), body tracking (e.g., by capturing images of the user's torso, arms, hands, legs, etc. while the device is worn on the head of user), and/or for localization (e.g., using visual odometry, visual inertial odometry, or other simultaneous localization and mapping (SLAM) technique).

Input-output circuitry 22 may also include other sensors and input-output components if desired (e.g., gaze tracking sensors, ambient light sensors, force sensors, temperature sensors, touch sensors, buttons, capacitive proximity sensors, light-based proximity sensors, other proximity sensors, strain gauges, gas sensors, pressure sensors, moisture sensors, magnetic sensors, audio components, haptic output devices such as vibration motors, light-emitting diodes, other light sources, etc.).

Head-mounted device 10 may also include communication circuitry 34 to allow the head-mounted device to communicate with external equipment (e.g., a tethered computer, a portable device such as a handheld device or laptop computer, or other electrical equipment). Communication circuitry 34 may be used for both wired and wireless communication with external equipment.

Communication circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

The radio-frequency transceiver circuitry in wireless communications circuitry 34 may handle wireless local area network (WLAN) communications bands such as the 2.4 GHz and 5 GHz Wi-Fi® (IEEE 802.11) bands, wireless personal area network (WPAN) communications bands such as the 2.4 GHz Bluetooth® communications band, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz (e.g., 3G bands, 4G LTE bands, 5G New Radio Frequency Range 1 (FR1) bands below 10 GHz, etc.), a near-field communications (NFC) band (e.g., at 13.56 MHz), satellite navigations bands (e.g., an L1 global positioning system (GPS) band at 1575 MHz, an L5 GPS band at 1176 MHz, a Global Navigation Satellite System (GLONASS) band, a BeiDou Navigation Satellite System (BDS) band, etc.), ultra-wideband (UWB) communications band(s) supported by the IEEE 802.15.4 protocol and/or other UWB communications protocols (e.g., a first UWB communications band at 6.5 GHz and/or a second UWB communications band at 8.0 GHz), and/or any other desired communications bands.

The radio-frequency transceiver circuitry may include millimeter/centimeter wave transceiver circuitry that supports communications at frequencies between about 10 GHz and 300 GHz. For example, the millimeter/centimeter wave transceiver circuitry may support communications in Extremely High Frequency (EHF) or millimeter wave communications bands between about 30 GHz and 300 GHz and/or in centimeter wave communications bands between about 10 GHz and 30 GHz (sometimes referred to as Super High Frequency (SHF) bands). As examples, the millimeter/centimeter wave transceiver circuitry may support communications in an IEEE K communications band between about 18 GHz and 27 GHz, a $K_a$ communications band between about 26.5 GHz and 40 GHz, a $K_u$ communications band between about 12 GHz and 18 GHz, a V communications band between about 40 GHz and 75 GHz, a W communications band between about 75 GHz and 110 GHz, or any other desired frequency band between approximately 10 GHz and 300 GHz. If desired, the millimeter/centimeter wave transceiver circuitry may support IEEE 802.11ad communications at 60 GHz (e.g., WiGig or 60 GHz Wi-Fi bands around 57-61 GHz), and/or $5^{th}$ generation mobile networks or $5^{th}$ generation wireless systems (5G) New Radio (NR) Frequency Range 2 (FR2) communications bands between about 24 GHz and 90 GHz.

Antennas in wireless communications circuitry 34 may include antennas with resonating elements that are formed from loop antenna structures, patch antenna structures, inverted-F antenna structures, slot antenna structures, planar inverted-F antenna structures, helical antenna structures, dipole antenna structures, monopole antenna structures, hybrids of these designs, etc. Different types of antennas may be used for different bands and combinations of bands.

For example, one type of antenna may be used in forming a local wireless link and another type of antenna may be used in forming a remote wireless link antenna.

Figure 2:
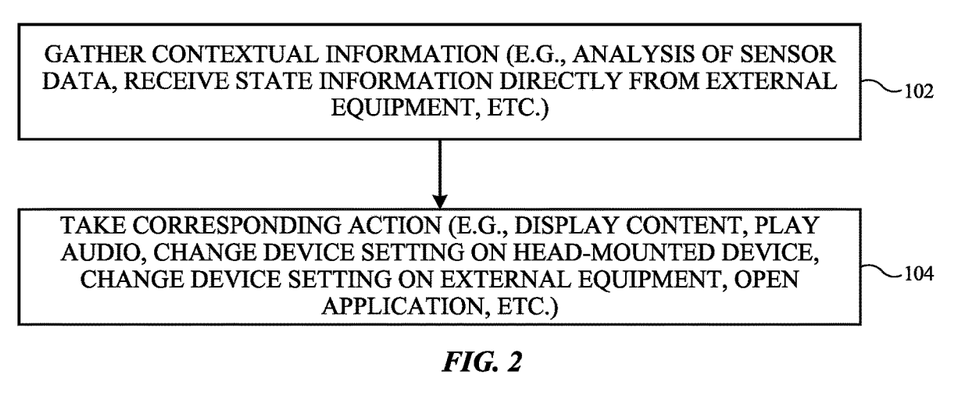
FIG. 2 is a flowchart showing an illustrative method for taking action based on contextual information in a head-mounted device in accordance with some embodiments.

FIG. 2 is a flowchart showing an illustrative method performed by a head-mounted device (e.g., control circuitry 14 in device 10). The blocks of FIG. 2 may be stored as instructions in memory of head-mounted device 10, with the instructions configured to be executed by one or more processors in the head-mounted device.

During the operations of block 102, the head-mounted device may gather contextual information. There are many ways for head-mounted device 10 to attempt to gather contextual information. The head-mounted device may analyze sensor data such as images from cameras 28 (e.g., using computer vision processors 18) or audio data from microphones 30 (e.g., using audio recognition processors 20).

Analyzing images from cameras 28 using computer vision processors 18 may, for example, be used to identify physical objects in the physical environment around the user. Any desired physical objects (e.g., displays, televisions, cellular telephones, laptop computers, people, furniture, vehicles, light switches, doorbells, locks, smoke alarms, lights, speakers, thermostats, remote controls, ovens, refrigerators, stoves, grills, coffee makers, toasters, microwaves, etc.) may be identified using the computer vision analysis. In addition to identifying physical objects, the analysis of images from cameras 28 may be used to determine additional contextual information from the physical environment around the user. For example, in addition to recognizing that there is a television displaying content, the computer vision analysis may determine that the displayed content is sports, a movie, a television show, etc. The computer vision analysis may be used to determine contextual information to a certain probability. For example, the computer vision analysis may determine that there is an 80% likelihood that the user is watching sports on television, as one example.

Analyzing audio data from microphones 30 using audio recognition processors 20 may, for example, be used to identify audio in the physical environment around the user. Any desired type of audio (e.g., speech content, audio from an external electronic device, a type of audio such as a song or radio station, the voice of a specific person, ambient environment sounds, sounds of objects moving or colliding, etc.) may be identified using the audio recognition analysis. The audio recognition analysis may be used to determine contextual information to a certain probability. For example, the audio recognition analysis may determine that there is an 90% likelihood that the user is listening to recorded music, as one example.

Analysis of sensor data to determine contextual information (e.g., using computer vision analysis, audio recognition analysis, etc.) may require high amounts of processing power. Additionally, there is uncertainty associated with the analysis of sensor data. In some cases, these issues may be bypassed by receiving state information directly from external equipment in the same physical environment as the head-mounted device.

Consider the example of a user of a head-mounted device watching a movie on a television. The computer vision processors may attempt to identify the television in the user's physical environment and may attempt to determine the type of content being viewed on the television. However, this analysis may take longer than desired, may require high amounts of processing, may have higher uncertainty than desired, etc. Instead or in addition of analyzing the images, the head-mounted device may receive state information directly from the television. The television may report state information regarding the type of television, the size of the television, the type of content being displayed on the television, etc. The information received directly from the external equipment (the television in this scenario) may be treated as accurate with no associated uncertainty (since it is being reported from the television itself).

Receiving state information directly from external equipment may therefore provide contextual information to head-mounted device 10 quickly, with low amounts of processing power (because the computer vision processors and/or audio recognition processors are not required), and with high certainty.

Head-mounted device 10 may receive state information from any desired external equipment (e.g., displays, televisions, cellular telephones, speakers, laptop computers, computer monitors, vehicles, remote controls, light switches, doorbells, locks, smoke alarms, lights, thermostats, smart kitchen appliances such as ovens, refrigerators, stoves, grills, coffee makers, toasters, microwaves, etc., other internet of things (IoT) devices, etc.). In general, any external equipment capable of communicating with head-mounted device 10 (via wired communication and/or wireless communication) may optionally transmit state information to head-mounted device 10 during the operations of block 102. As an example, the external equipment may use Bluetooth communications to transmit state information to head-mounted device 10.

Head-mounted device 10 may sometimes both analyze sensor data to determine contextual information and receive state information directly from external equipment. In another scenario, analysis of sensor data may prompt the head-mounted device to receive state information directly from external equipment (e.g., the computer vision analysis may identify external equipment, prompting communication of state information from the external equipment to the head-mounted device). In yet another scenario, analysis of sensor data may only be performed if the state information received directly from external equipment is insufficient to determine desired contextual information.

After gathering the contextual information during the operations of block 102, head-mounted device 10 may take corresponding action during the operations of block 104.

Head-mounted device 10 may take many possible actions during the operations of block 104. As one example, head-mounted device 10 may display content on display 24 during the operations of block 104. The displayed content may be, for example, augmented reality content that is based on the contextual information determined at block 102. The head-mounted device may receive state information from external equipment at block 102 and display content that is based on the received state information at block 104. The displayed content may be based on a type of application running on the external equipment, based on application information from the external equipment, etc. As a specific example, the head-mounted device may display sports scores and/or sports statistics adjacent to a display of the external equipment in accordance with receiving state information identifying that sports content is being displayed on the display of the external equipment. The displayed content may be positioned based on a location of the external equipment. As an example, the displayed content may be positioned to overlap (or be aligned with) the external equipment when viewed from the perspective of an eye box of the head-mounted device.

As another example, head-mounted device 10 may play audio using speakers 26 during the operations of block 104. The played audio may be based on the contextual information determined at block 102. The head-mounted device may receive state information from external equipment at block 102 and play audio that is based on the received state information at block 104. The audio may be based on a type of application running on the external equipment, based on application information from the external equipment, etc. As a specific example, the external equipment may be a vehicle and the head-mounted device may play a podcast in response to receiving information from the vehicle regarding operation of the vehicle.

Head-mounted device 10 may also change one or more device settings on the head-mounted device and/or on external equipment during the operations of block 104. For example, the head-mounted device 10 may receive state information from external equipment at block 102 and, based on the state information, change a setting in head-mounted device 10. As a specific example, the external equipment may be a speaker that plays music and transmits state information regarding a song being played on the speaker. The head-mounted device may lower the volume of a speaker in the head-mounted device in accordance with receiving the state information.

As another example, the head-mounted device 10 may receive state information from external equipment at block 102 and, based on the state information, send an instruction to change a device setting on the external equipment at block 104. As a specific example, the external equipment may be a speaker that plays music and transmits state information regarding a song being played on the speaker. The head-mounted device may lower the volume of the audio played by the external equipment in accordance with receiving the state information.

As another example, the head-mounted device 10 may receive state information from external equipment at block 102 and, based on the state information, send an instruction to change a device setting on additional external equipment at block 104. As a specific example, the external equipment may be a speaker that plays music and transmits state information regarding a song being played on the speaker. The head-mounted device may mute a speaker in additional external equipment (e.g., a television) in accordance with receiving the state information.

Head-mounted device 10 may open an application during the operations of block 104. The head-mounted device 10 may receive state information from external equipment at block 102 and, based on the state information, open an application at block 104. As a specific example, the external equipment may be a laptop computer that transmits state information identifying a workout video being displayed on a display of the laptop computer. The head-mounted device may open an exercise application in accordance with receiving the state information.

Figure 3:
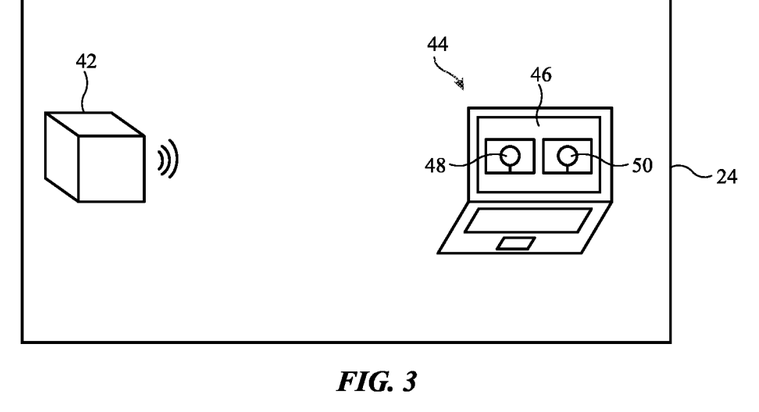
FIGS. 3 and 4 are views of a physical environment through an illustrative display in a head-mounted device in accordance with some embodiments.
Figure 4:
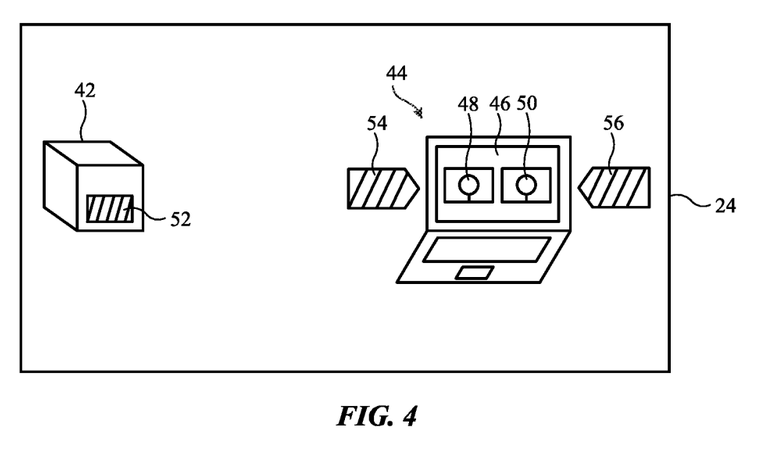

FIGS. 3 and 4 are views of a physical environment through an illustrative display 24 (as visible to a user of head-mounted device 10). As shown in both FIGS. 3 and 4, physical objects such as speaker 42 and laptop computer 44 are viewable through display 24. The physical objects may be directly viewable through display 24 when display 24 is a transparent or translucent display. Alternatively, display 24 may be an opaque display and images of the physical objects are displayed on display 24 using a pass-through camera.

In the example of FIGS. 3 and 4, laptop computer has a display 46 that is used to display video conferencing content. In other words, a video conferencing application is running on laptop computer 44 that allows a user to video conference with participant 48 and participant 50. Video feeds for participants 48 and 50 are shown in respective windows for the video conference.

It may be desirable for head-mounted device 10 to determine contextual information such as the presence of speaker 42 and laptop computer 44 within the physical environment around the user, the type of audio being played by speaker 42, the type of content being displayed on laptop computer 44, etc. This contextual information may at least partially be determined by directly receiving state information from the speaker 42 (sometimes referred to as external equipment 42) and laptop computer 44 (sometimes referred to as external equipment 44).

Speaker 42 may transmit state information identifying the speaker and a song being played by the speaker. When head-mounted device 10 receives the state information, the head-mounted device 10 determines that a speaker is present in the physical environment and determines the song being played by the speaker. The head-mounted device may, in response, display content on display 24 as shown in FIG. 4. In the example of FIG. 4, the head-mounted device displays an overlay 52 over speaker 42. Overlay 52 may include text that identifies the song being played by speaker 42, as one example.

Laptop computer 44 may transmit state information identifying the laptop computer, a video conference application operating on the laptop computer, and the participants in the video conference. When head-mounted device 10 receives the state information, the head-mounted device 10 determines that a laptop computer is present in the physical environment, determines that the laptop computer is operating the video conference application, and determines the identities of the participants in the video conference. The head-mounted device may, in response, display content on display 24 as shown in FIG. 4. In the example of FIG. 4, the head-mounted device displays a first overlay 54 on the left side of laptop computer 44 and a second overlay 56 on the right side of laptop computer 44. Overlay 54 may, as an example, identify participant 48, provide links to social media profiles for participant 48, etc. Overlay 56 may, as an example, identify participant 50, provide links to social media profiles for participant 50, etc.

FIG. 4 shows how content may be displayed on display 24 based on determined positions of external equipment in the physical environment. The positions of the external equipment in the physical environment may be determined by analyzing images from cameras 28. The displayed content may be positioned to directly overlap external equipment (as with overlay 52) or to be aligned relative to the external equipment without directly overlapping the external equipment (as with overlays 54 and 56). In this example, the displayed content is world-locked content. This example is merely illustrative and in general the displayed content may be head-locked content, body-locked content, or world-locked content.

The example in FIG. 4 of displaying content 52, 54, and 56 based on state information received from the external equipment is merely illustrative. If desired, other actions may be taken instead of or in addition to displaying the content. As one example, head-mounted device 10 may transmit an instruction to speaker 42 that causes speaker 42 to be muted in response to receiving the state information from laptop computer 44 identifying that laptop computer 44 is participating in an active video conference. As another example, head-mounted device 10 may mute its own speaker 26 in response to receiving the state information from laptop computer 44 identifying that laptop computer 44 is participating in an active video conference and playing audio for the video conference using a speaker of the laptop computer. As another example, head-mounted device 10 may temporarily suppress one or more user notifications (e.g., in a do not disturb mode or a focus mode) in response to receiving the state information from laptop computer 44 identifying that laptop computer 44 is participating in an active video conference.

Head-mounted device 10 may sometimes determine contextual information by both analyzing sensor data and receiving state information directly from external equipment. In the example of FIGS. 3 and 4, head-mounted device 10 receives state information directly from speaker 42 and laptop computer 44. However, head-mounted device 10 may analyze sensor data (e.g., computer vision analysis on images from cameras 28 and audio recognition analysis on audio data from microphone 30) before, during, and after the receiving of the state information from speaker 42 and laptop computer 44. In other words, the analysis of sensor data is performed to determine as much contextual information as possible regardless of whether state information is received from external equipment.

In another scenario, analysis of sensor data may prompt the head-mounted device to receive state information directly from external equipment. In the example of FIGS. 3 and 4, head-mounted device 10 may analyze sensor data (e.g., computer vision analysis on images from cameras 28 and audio recognition analysis on audio data from microphone 30) to identify external equipment such as speaker 42 and laptop computer 44 in the physical environment around head-mounted device 10. In accordance with detecting the external equipment by analyzing the sensor data, the head-mounted device may receive the state information directly from speaker 42 and laptop computer 44. In accordance with detecting the external equipment by analyzing the sensor data, the head-mounted device may optionally transmit a request for state information to speaker 42 and laptop computer 44.

In another scenario, analysis of sensor data may only be performed if the state information received directly from external equipment is insufficient to determine desired contextual information. In the example of FIGS. 3 and 4, head-mounted device 10 may receive state information directly from speaker 42 and laptop computer 44. The received state information may be analyzed (e.g., to determine if the received state information satisfies a criterion). In some cases, the received state information may be sufficient to make a contextual determination and take corresponding action based on the contextual determination (e.g., the received state information satisfies the criterion). In other cases, the received state information may be insufficient to make a contextual determination and take corresponding action based on the contextual determination (e.g., the received state information does not satisfy the criterion). When the received state information is insufficient (does not satisfy the criterion), the head-mounted device may begin analysis of the sensor data (e.g., computer vision analysis on images from cameras 28 and audio recognition analysis on audio data from microphone 30) to determine contextual information. The head-mounted device may then take corresponding action (e.g., displaying content, playing audio, changing audio, changing one or more settings, etc.) based at least on the contextual information. The head-mounted device may sometimes take corresponding action (e.g., displaying content, playing audio, changing audio, changing one or more settings, etc.) based on the contextual information and the state information received from the external equipment. The head-mounted device may sometimes take corresponding action (e.g., displaying content, playing audio, changing audio, changing one or more settings, etc.) based only on the contextual information.

Figure 5:
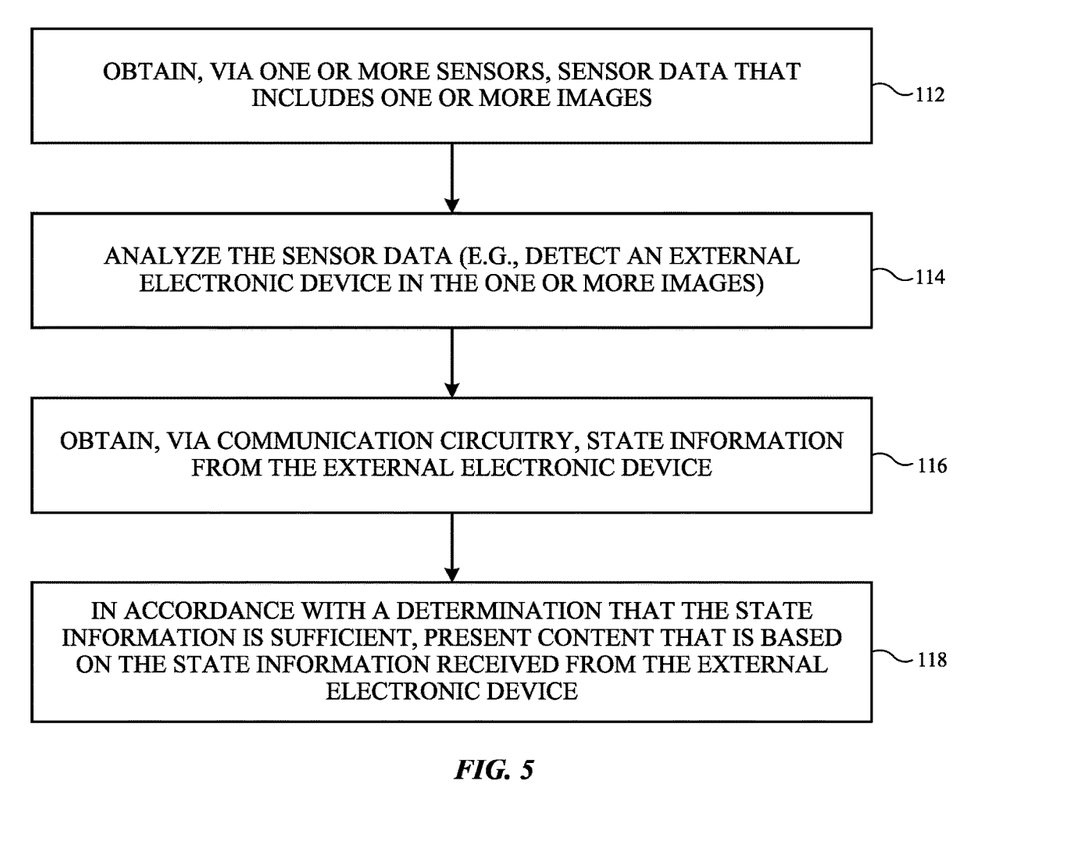
FIG. 5 is a flowchart showing an illustrative method for detecting an external electronic device using sensor data then receiving state information from the external electronic device in accordance with some embodiments.

FIG. 5 is a flowchart showing an illustrative method performed by a head-mounted device (e.g., control circuitry 14 in device 10). The blocks of FIG. 5 may be stored as instructions in memory of head-mounted device 10, with the instructions configured to be executed by one or more processors in the head-mounted device.

During the operations of block 112, the head-mounted device obtains, via one or more sensors, sensor data. The sensor data may include images from cameras 28, audio data from microphones 30, motion data from position and motion sensors 32, and/or other desired sensor data.

In the example of FIGS. 3 and 4, the head-mounted device may capture images that include speaker 42 and laptop computer 44 using one or more cameras 28 on the head-mounted device during the operations of block 112.

During the operations of block 114, the head-mounted device analyzes the sensor data. Analyzing the sensor data may include detecting an external electronic device in the one or more images. The external electronic device may include one or more of a display, television, cellular telephone, speaker, laptop computer, computer monitor, vehicle, remote control, light switch, doorbell, lock, smoke alarm, light, thermostat, oven, refrigerator, stove, grill, coffee maker, toaster, microwave, or other internet of things (IoT) device. Analyzing the sensor data may include detecting a position of the external electronic device within a physical environment around (and including) the head-mounted device.

In the example of FIGS. 3 and 4, during the operations of block 114, the head-mounted device may detect speaker 42 and laptop computer 44 in the images captured in block 112.

During the operations of block 116, head-mounted device 10 may obtain, via communication circuitry 34, state information from the external electronic device. Head-mounted device 10 may transmit a request for state information to the external electronic device during the operations of block 116. Head-mounted device 10 may wirelessly pair with the external electronic device (e.g., in block 116) in response to the detection of the external electronic device at block 114. Head-mounted device 10 may repeatedly receive state information from the external electronic device at regular intervals during the operation of block 116. The head-mounted device 10 may receive the state information over a wired communication link or a wireless communication link (e.g., a Bluetooth communications link, a Wi-Fi communications link, a cellular communications link, etc.). In general, the head-mounted device may wirelessly receive state information from the external electronic device at any desired frequency band.

The state information received during the operations of block 116 may include an application running on the external electronic device, application information for the application running on the external electronic device, content being displayed on a display in the external electronic device, audio being played on a speaker in the external electronic device, etc. The head-mounted device may determine an action being performed by a user of the head-mounted device (e.g., driving, running, biking, cooking, watching television, talking on the phone, sleeping, etc.) based on the state information received from the external electronic device. The head-mounted device may determine a location of the head-mounted device (e.g., a car, a kitchen, a living room, a bedroom, a park, a house belonging to the owner of the head-mounted device, a house not belonging to the owner of the head-mounted device, a doctor's office, a store, etc.) based on the state information received from the external electronic device.

In the example of FIGS. 3 and 4, during the operations of block 116, the head-mounted device may receive state information from speaker 42 identifying the speaker and a type of audio being played by the speaker. During the operations of block 116, the head-mounted device may receive state information from laptop computer 44 identifying the laptop computer, a video conferencing application operating on the laptop computer, participants in the video conference, etc.

During the operations of block 118, head-mounted device 10 may, in accordance with a determination that the state information satisfies a criterion (e.g., is sufficient to make a contextual determination), present (via display 24 or speakers 26) content that is based on the state information received from the external electronic device (at block 116). The presented content may be augmented reality content. The head-mounted device may take other desired action based on the state information received from the external electronic device such as playing audio, changing a device setting for the head-mounted device, the external electronic device, and/or an additional external electronic device, running an application, etc.

Another example of an action that may be based on the state information received from the external electronic device is changing suggestion rankings for head-mounted device 10. Head-mounted device 10 may present one or more suggested actions for the user to optionally accept. Multiple actions may be suggested or only one action may be suggested. The priority of suggestions that are presented may be based on a ranking of how likely the suggestions are to be accepted, a priority of the suggestions, etc. The state information received from the external electronic device may cause a given suggestion to be more likely to be presented to the user (e.g., the ranking for a given suggestion may be increased).

As a specific example, during the operations of block 118 the head-mounted device 10 may, based on information received at block 116, pair a user's wireless headphones to laptop computer 44. Alternatively, head-mounted device 10 may present a user notification suggesting pairing the user's wireless headphones with laptop computer 44 in response to the information received at block 116. If the user accepts the suggestion, then the wireless headphones may be paired with laptop computer 44. As yet another alternative, a ranking of suggested actions may be modified by head-mounted device 10 in response to the information received at block 116. This may cause a suggestion to pair the user's wireless headphones with laptop computer 44 to be prominently featured in the user interface of head-mounted device 10 the next time head-mounted device 10 is woken up by the user.

Before presenting the content, the head-mounted device may determine a position at which to present (e.g., display) the content based on the position of the external electronic device. The presented content may be positioned to directly overlap the external electronic device (when viewed from an eye box), to be aligned with the external electronic device without directly overlapping the external electronic device (when viewed from the eye box), etc.

In the example of FIGS. 3 and 4, during the operations of block 118, head-mounted device 10 displays content 52, 54, and/or 56 based on the state information received from speaker 42 and/or laptop computer 44. Head-mounted device 10 may determine the position of content 52, 54, and/or 56 based on the positions of speaker 42 and/or laptop computer 44.

During the operations of block 118, head-mounted device 10 may, in accordance with a determination that the state information (received at block 116) does not satisfy a criterion (e.g., is insufficient to make a contextual determination), estimate state information for the external electronic device based on the sensor data (from block 112) and present (via display 24 or speakers 26) content that is based on the estimated state information for the external electronic device.

Consider an example where laptop computer 44 in FIGS. 3 and 4 provides state information that is insufficient for head-mounted device 10 to determine the type of content on display 46 of the laptop computer. The head-mounted device may estimate the type of content on the display for the laptop computer based on the images of the laptop computer and present content 54 and/or 56 that is based on the estimated state information (e.g., the estimated type of content on the display) for the laptop computer.

In some cases, the head-mounted device may cease to analyze the sensor data (e.g., stop the operations of block 114) in response to obtaining the state information from the external electronic device in block 116. In some cases, analyzing the sensor data in block 114 may include continuing to analyze the sensor data after obtaining the state information from the external electronic device in block 116. In some cases, the head-mounted device may only continue to analyze the sensor data (as in block 114) in accordance with a determination that the state information is insufficient (e.g., to make a contextual determination) in block 118.

Figure 6:
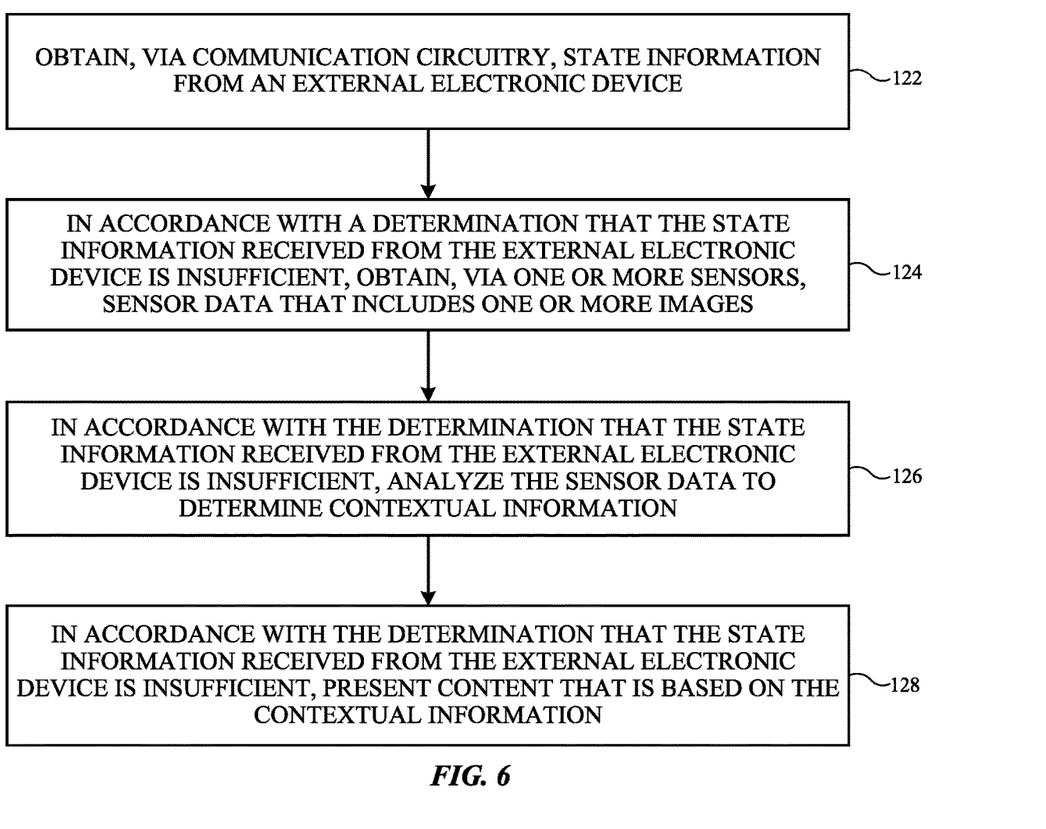
FIG. 6 is a flowchart showing an illustrative method for receiving state information from an external electronic device then analyzing sensor data to determine contextual information in accordance with some embodiments.

FIG. 6 is a flowchart showing an illustrative method performed by a head-mounted device (e.g., control circuitry 14 in device 10). The blocks of FIG. 6 may be stored as instructions in memory of head-mounted device 10, with the instructions configured to be executed by one or more processors in the head-mounted device.

During the operations of block 122, the head-mounted device may obtain, via communication circuitry 34, state information from an external electronic device. Head-mounted device 10 may transmit a request for state information to the external electronic device during the operations of block 122. Head-mounted device 10 may repeatedly receive state information from the external electronic device at regular intervals during the operation of block 122. The head-mounted device 10 may receive the state information over a wired communication link or a wireless communication link.

The state information received during the operations of block 122 may include an application running on the external electronic device, application information for the application running on the external electronic device, content being displayed on a display in the external electronic device, audio being played on a speaker in the external electronic device, etc.

In the example of FIGS. 3 and 4, during the operations of block 122, the head-mounted device may receive state information from speaker 42 identifying the speaker and a type of audio being played by the speaker. During the operations of block 122, the head-mounted device may receive state information from laptop computer 44 identifying the laptop computer and a video conferencing application operating on the laptop computer.

During the operations of block 124, the head-mounted device may, in accordance with a determination that the state information received from the external electronic device fails to satisfy a criterion (e.g., is insufficient to make a contextual determination), obtain, via one or more sensors, sensor data. The sensor data may include images from cameras 28, audio data from microphones 30, motion data from position and motion sensors 32, and/or other desired sensor data.

The one or more sensors used to obtain sensor data in block 124 may be off or operating in a low-power mode during the operations of block 122. Then, in accordance with the determination that the state information received from the external electronic device is insufficient (e.g., to make a contextual determination), the one or more sensors may be turned on or switched from a low-power mode to a high-power mode in block 124. In other words, the power consumption of the one or more sensors may be increased during the operations of block 124 relative to during the operations of block 122. For example, a camera may be off during the operations of block 122 and then turned on to capture images during the operations of block 124. As another example, a camera may capture images at a first frequency (in a low-power mode) during the operations of block 122 and subsequently capture images at a second frequency (in a high-power mode) that is higher than the first frequency during the operations of block 124. In general, a sensor may be off during the operations of block 122 and then turned on during the operations of block 124. As another example, a sensor may have a first sampling frequency (in a low-power mode) during the operations of block 122 and subsequently capture data using a second sampling frequency (in a high-power mode) that is higher than the first sampling frequency during the operations of block 124.

In the example of FIGS. 3 and 4, the head-mounted device may, in accordance with a determination that the state information received from speaker 42 and/or laptop computer 44 is insufficient (e.g., to make a contextual determination), capture images that include speaker 42 and laptop computer 44 using one or more cameras 28 during the operations of block 124.

During the operations of block 126, the head-mounted device may, in accordance with a determination that the state information received from the external electronic device is insufficient (e.g., to make a contextual determination), analyze the sensor data to determine contextual information. Analyzing the sensor data may include detecting an external electronic device in the one or more images. The external electronic device may include one or more of a display, television, cellular telephone, speaker, laptop computer, computer monitor, vehicle, remote control, light switch, doorbell, lock, smoke alarm, light, thermostat, oven, refrigerator, stove, grill, coffee maker, toaster, microwave, or other internet of things (IoT) device. Analyzing the sensor data may include detecting a position of the external electronic device within a physical environment around (and including) the head-mounted device. Analyzing the sensor data my include determining contextual information (e.g., the type of content being displayed on an external electronic device, the location of the head-mounted device, an action being performed by the head-mounted device, etc.) based on the images.

In the example of FIGS. 3 and 4, during the operations of block 126, the head-mounted device may analyze images of laptop computer 44 to identify participants in a video conference being displayed on the laptop computer.

During the operations of block 128, the head-mounted device may, in accordance with a determination that the state information received from the external electronic device is insufficient (e.g., to make a contextual determination), present (via display 24 or speakers 26) content that is based on the contextual information (determined at block 126). The content may be augmented reality content. The presented content may be based only on the contextual information (from block 126) or may be based on the contextual information (from block 126) and the received state information (from block 122). The head-mounted device may take other desired action in block 128 based on at least one of the state information received from the external electronic device (at block 122) and the contextual information (determined at block 126) such as playing audio, changing a device setting for the head-mounted device, the external electronic device, and/or an additional external electronic device, running an application, etc.

Before presenting the content, the head-mounted device may determine a position at which to present the content based on the position of the external electronic device. The presented content may be positioned to directly overlap the external electronic device (when viewed from an eye box), to be aligned with the external electronic device without directly overlapping the external electronic device (when viewed from the eye box), etc.

In the example of FIGS. 3 and 4, during the operations of block 128, head-mounted device 10 presents (e.g., displays) content 52, 54, and 56 based on the contextual information (determined at block 126).

The head-mounted device 10 may, in accordance with a determination that the state information received from the external electronic device is sufficient (e.g., for a contextual determination), present (via display 24 or speakers 26) content that is based on the state information (received at block 122). The head-mounted device 10 may, in accordance with a determination that the state information received from the external electronic device is sufficient (e.g., for a contextual determination), present (via display 24 or speakers 26) content that is based on the state information (received at block 122) and not the contextual information determined at block 126. The head-mounted device 10 may, in accordance with a determination that the state information received from the external electronic device is sufficient (e.g., for a contextual determination), forego obtaining and analyzing the sensor data in blocks 124 and 126. The head-mounted device may determine an action being performed by a user of the head-mounted device (e.g., driving, running, biking, cooking, watching television, talking on the phone, sleeping, etc.) based on at least one of the state information received from the external electronic device (at block 122) and the contextual information (determined at block 126). The head-mounted device may determine a location of the head-mounted device (e.g., a car, a kitchen, a living room, a bedroom, a park, a house belonging to the owner of the head-mounted device, a house not belonging to the owner of the head-mounted device, a doctor's office, a store, etc.) based on at least one of the state information received from the external electronic device (at block 122) and the contextual information (determined at block 126).

Out of an abundance of caution, it is noted that to the extent that any implementation of this technology involves the use of personally identifiable information, implementers should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. An electronic device comprising:
   one or more sensors comprising one or more cameras;
   communication circuitry;
   one or more processors; and
   memory storing instructions configured to be executed by the one or more processors, the instructions for:
   capturing, via the one or more cameras, one or more images;
   analyzing the one or more images, wherein analyzing the one or more images comprises detecting an external electronic device in the one or more images;
   obtaining, via the communication circuitry, state information from the external electronic device; and
   in accordance with a determination that the state information does not satisfy a criterion:
   capturing, via the one or more cameras, one or more additional images;
   estimating state information for the external electronic device based on the one or more additional images; and
   presenting content that is based on the estimated state information for the external electronic device.

2. The electronic device defined in claim 1, wherein the instructions further comprise instructions for:
   ceasing to analyze the one or more images in response to obtaining, via the communication circuitry, the state information from the external electronic device.

3. The electronic device defined in claim 1, wherein analyzing the one or more images comprises determining a first position of the external electronic device and wherein the instructions further comprise instructions for:
   determining a second position at which to present the content based on the first position of the external electronic device, wherein presenting the content comprises presenting the content at the second position.

4. The electronic device defined in claim 3, wherein the external electronic device is positioned in a physical environment, wherein analyzing the one or more images to determine the first position of the external electronic device comprises determining the first position of the external electronic device within the physical environment, and wherein the electronic device further comprises:
   one or more displays configured to emit light from a transparent structure towards an eye box, wherein the second position overlaps the external electronic device when viewed from the eye box.

5. The electronic device defined in claim 1, wherein the instructions further comprise instructions for:
   in response to detecting the external electronic device in the one or more images:
   wirelessly pairing with the external electronic device; and
   transmitting, via the communication circuitry, a request for state information to the external electronic device.

6. The electronic device defined in claim 1, wherein the state information comprises an application running on the external electronic device, comprises application information for an application running on the external electronic device, identifies content being displayed on a display in the external electronic device, or identifies audio being played on a speaker in the external electronic device.

7. The electronic device defined in claim 1, wherein the instructions further comprise instructions for:
   changing one or more settings in the electronic device, the external electronic device, or an additional external electronic device based on the state information received from the external electronic device.

8. A method of operating an electronic device that comprises one or more sensors and communication circuitry, the one or more sensors comprising one or more cameras and the method comprising:
   capturing, via the one or more cameras, one or more images;
   analyzing the one or more images, wherein analyzing the one or more images comprises detecting an external electronic device in the one or more images;
   obtaining, via the communication circuitry, state information from the external electronic device; and
   in accordance with a determination that the state information does not satisfy a criterion:
   capturing, via the one or more cameras, one or more additional images;
   estimating state information for the external electronic device based on the one or more additional images; and
   presenting content that is based on the estimated state information for the external electronic device.

9. The method defined in claim 8, further comprising:
   ceasing to analyze the one or more images in response to obtaining, via the communication circuitry, the state information from the external electronic device.

10. The method defined in claim 8, wherein analyzing the one or more images comprises determining a first position of the external electronic device and wherein the method further comprises:
    determining a second position at which to present the content based on the first position of the external electronic device, wherein presenting the content comprises presenting the content at the second position.

11. The method defined in claim 10, wherein the external electronic device is positioned in a physical environment, wherein analyzing the one or more images to determine the first position of the external electronic device comprises determining the first position of the external electronic device within the physical environment, wherein the electronic device further comprises one or more displays configured to emit light from a transparent structure towards an eye box, and wherein the second position overlaps the external electronic device when viewed from the eye box.

12. The method defined in claim 8, further comprising:
    in response to detecting the external electronic device in the one or more images:
    wirelessly pairing with the external electronic device; and
    transmitting, via the communication circuitry, a request for state information to the external electronic device.

13. The method defined in claim 8, wherein the state information comprises an application running on the external electronic device, comprises application information for an application running on the external electronic device, identifies content being displayed on a display in the external electronic device, or identifies audio being played on a speaker in the external electronic device.

14. The method defined in claim 8, further comprising:
    changing one or more settings in the electronic device, the external electronic device, or an additional external electronic device based on the state information received from the external electronic device.

15. A non-transitory computer-readable storage medium storing one or more programs configured to be executed by one or more processors of an electronic device that comprises one or more sensors and communication circuitry, the one or more sensors comprising one or more cameras and the one or more programs including instructions for:
- capturing, via the one or more cameras, one or more images;
- analyzing the one or more images, wherein analyzing the one or more images comprises detecting an external electronic device in the one or more images;
- obtaining, via the communication circuitry, state information from the external electronic device; and
- in accordance with a determination that the state information does not satisfy a criterion:
  - capturing, via the one or more cameras, one or more additional images;
  - estimating state information for the external electronic device based on the one or more additional images; and
  - presenting content that is based on the estimated state information for the external electronic device.

16. The non-transitory computer-readable storage medium defined in claim 15, wherein the instructions further comprise instructions for:
- ceasing to analyze the one or more images in response to obtaining, via the communication circuitry, the state information from the external electronic device.

17. The non-transitory computer-readable storage medium defined in claim 15, wherein analyzing the one or more images comprises determining a first position of the external electronic device and wherein the instructions further comprise instructions for:
- determining a second position at which to present the content based on the first position of the external electronic device, wherein presenting the content comprises presenting the content at the second position.

18. The non-transitory computer-readable storage medium defined in claim 17, wherein the external electronic device is positioned in a physical environment, wherein analyzing the one or more images to determine the first position of the external electronic device comprises determining the first position of the external electronic device within the physical environment, wherein the electronic device further comprises one or more displays configured to emit light from a transparent structure towards an eye box, and wherein the second position overlaps the external electronic device when viewed from the eye box.

19. The non-transitory computer-readable storage medium defined in claim 15, wherein the instructions further comprise instructions for:
- in response to detecting the external electronic device in the one or more images:
  - wirelessly pairing with the external electronic device; and
  - transmitting, via the communication circuitry, a request for state information to the external electronic device.

20. The non-transitory computer-readable storage medium defined in claim 15, wherein the state information comprises an application running on the external electronic device, comprises application information for an application running on the external electronic device, identifies content being displayed on a display in the external electronic device, or identifies audio being played on a speaker in the external electronic device.

21. The non-transitory computer-readable storage medium defined in claim 15, wherein the instructions further comprise instructions for:
- changing one or more settings in the electronic device, the external electronic device, or an additional external electronic device based on the state information received from the external electronic device.

* * * * *